UNITED STATES PATENT OFFICE.

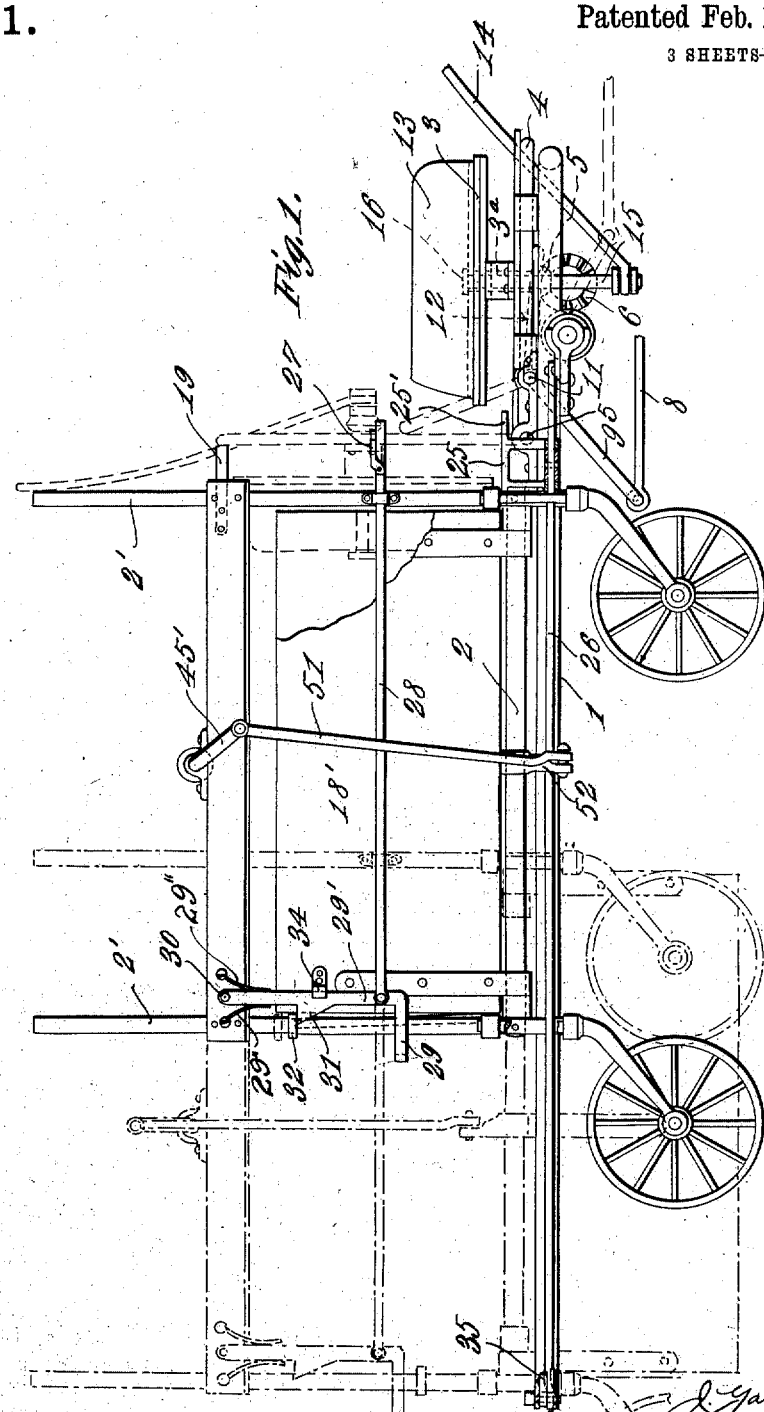

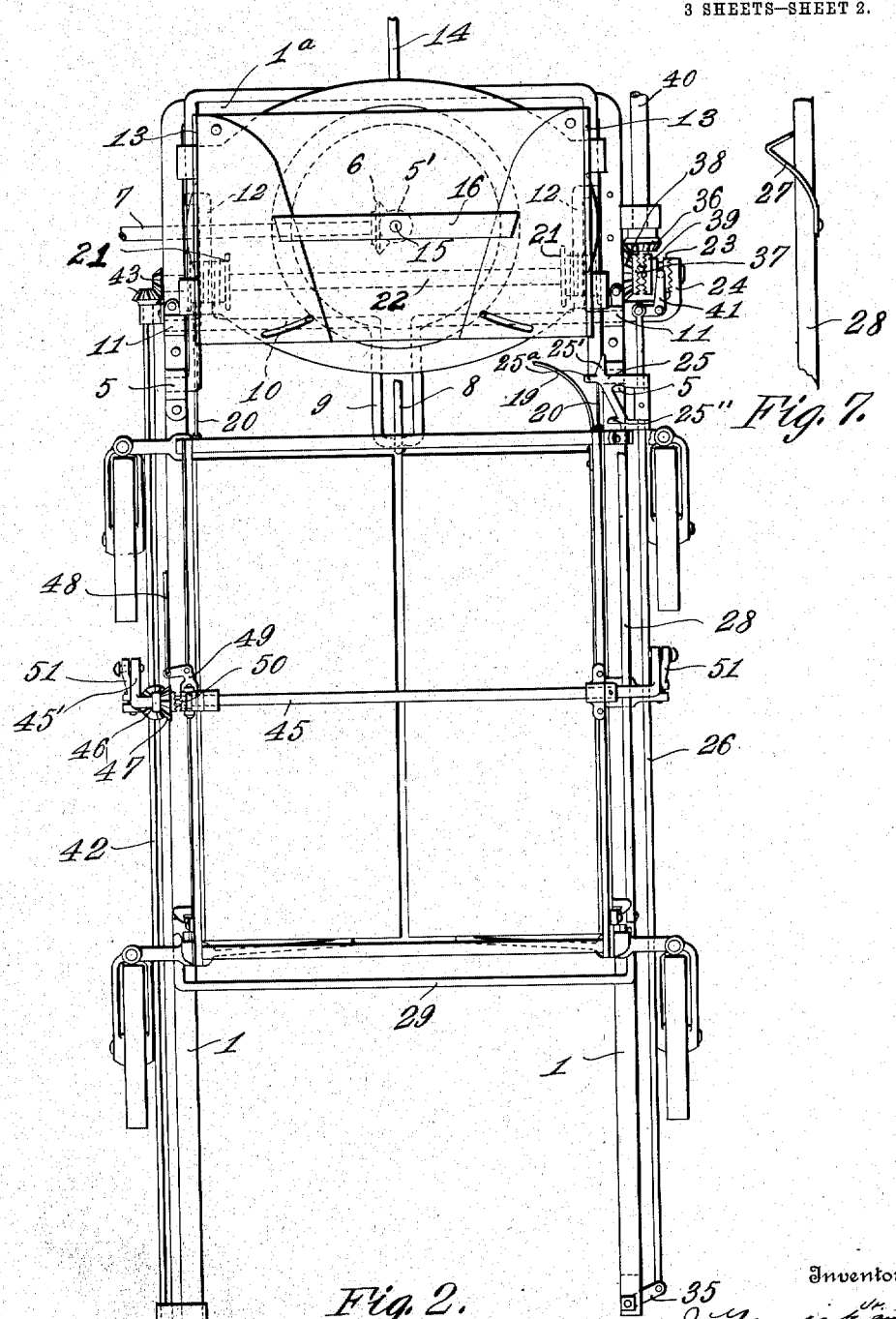

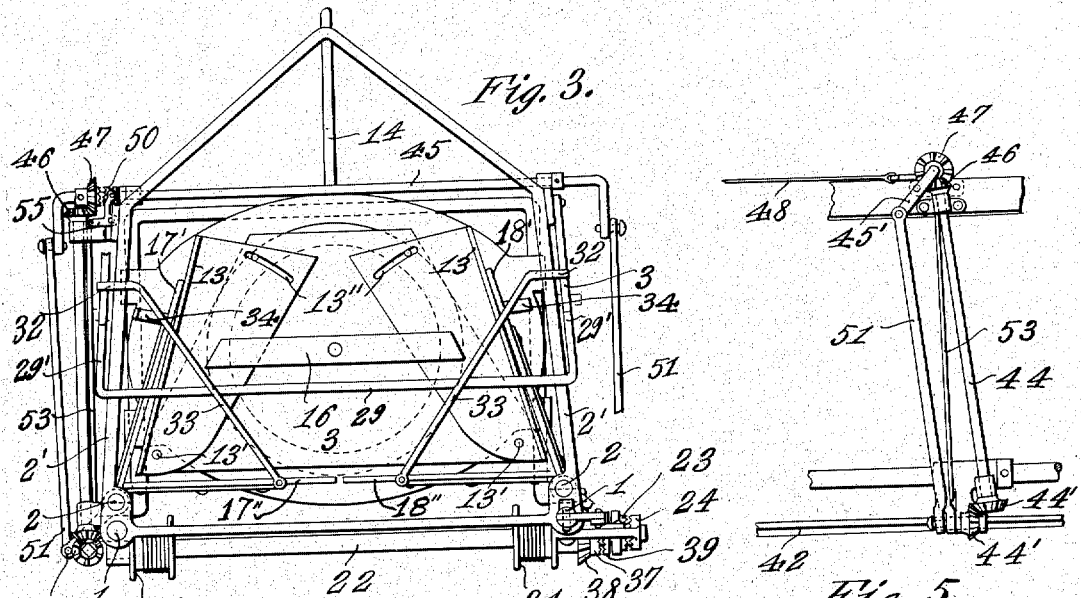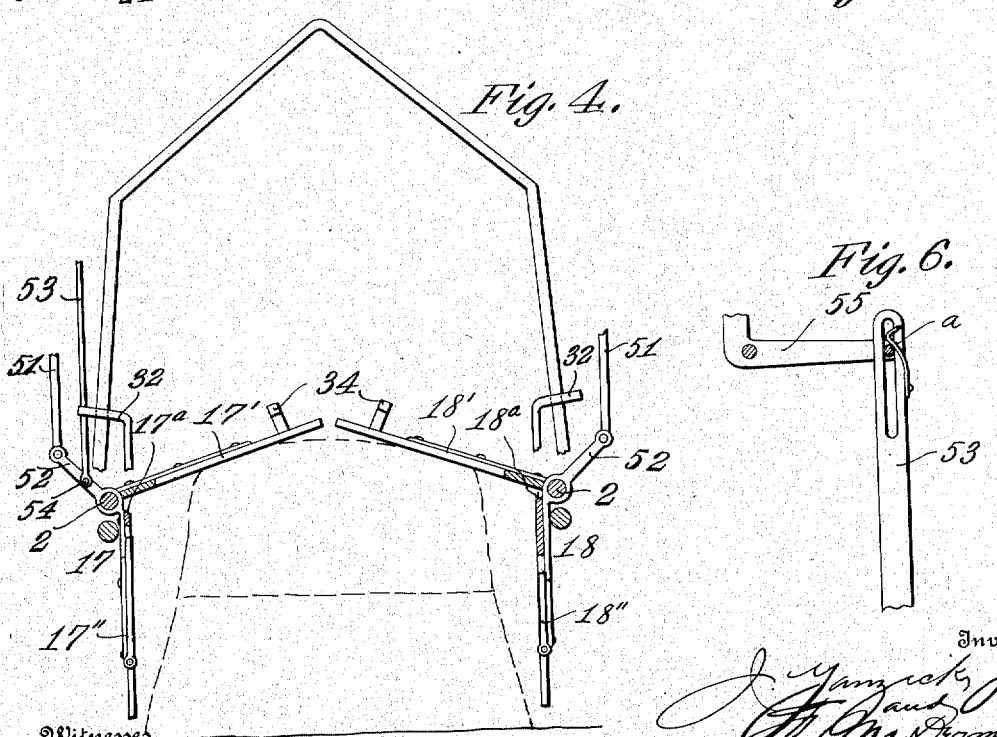

JOHN YANZICK, JR., AND FRANCIS McDERMOTT, OF SPEARFISH, SOUTH DAKOTA.

GRAIN-SHOCKER.

984,411. Specification of Letters Patent. Patented Feb. 14, 1911.

Application filed May 6, 1909, Serial No. 494,444. Renewed November 14, 1910. Serial No. 592,324.

*To all whom it may concern:*

Be it known that we, JOHN YANZICK, Jr., and FRANCIS McDERMOTT, citizens of the United States, residing at Spearfish, in the county of Lawrence and State of South Dakota, have invented certain new and useful Improvements in Grain-Shockers, of which the following is a specification.

The object of the present invention has been to devise a simple and advantageous machine designed particularly for forming bundles of grain into shocks and dropping the formed shocks on the ground.

The invention resides particularly in the special mechanism employed for receiving the bundles of grain from the binder, forming the bundles into the shock, and the peculiar devices employed for automatic operation of the shock forming mechanism and other parts incidental thereto.

Figure 1 is a side elevation of a machine embodying the invention; Fig. 2 is a top plan view; Fig. 3 is a rear view showing the position of the shock forming members when the receiving platform has been elevated so as to dump the bundles of grain onto the shock former; Fig. 4 is a sectional view showing the shock forming members in the positions assumed thereby when the shock is deposited on the ground; Fig. 5 is a fragmentary view showing in side elevation, the operating mechanism whereby the shock forming members are restored to their normal positions after having deposited the shock; Fig. 6 is a detail sectional view showing the connection between the clutch shifting lever in Fig. 5 and the rod for effecting automatic return of the shock forming members to their normal position, and Fig. 7 is a detail view of the spring plate on the horizontal release rod which operates the bail-catch for the shock forming members.

Similar reference characters refer to similar parts throughout the description and drawings.

Describing the detail construction of the machine of this invention, the same comprises a horizontal frame composed of longitudinal sills 1, a carriage or wheeled frame 2 slidable relative to the sills 1, and a bundle receiving platform 3 in front of said carriage. The main frame comprising the sills 1 has its front portion 1ª connected with a binder in any suitable manner, and preferably by substantial draft means, the bundle receiving platform 3 being carried by a pivoted U-shaped support 4 having pivotal connection as shown at 5 with the sills 1. A hollow spindle, shown in dotted lines in Fig. 1 at 3ª carries the platform 3 and a gear 5′ on the lower end of the spindle 3ª is in mesh with a beveled gear 6 on a transverse shaft 7. Suitable means, not shown, may be employed to turn the shaft 7 and impart rotation to the spindle 3ª and platform 3, after which the pivoted support 4 is raised into the position shown in dotted lines in Fig. 1, by means of an operating rod 8 (manually or otherwise operated) connected with the crank arm 9 of the crank shaft 10. The crank shaft 10 is journaled in bearings 11 on the sills 1 and is provided with the arms 12 the outer ends of which have a sliding contact with the sides of the support 4. It will be apparent that when the rod 8 is pulled upon, the arms 12 of the shaft 10 will raise the support 4 in a pivotal manner until the same assumes the position shown in dotted lines in Fig. 1. On the bundle receiving platform 3, which is raised with the support 4 are shock forming plates 13, each of which is of angular formation in cross section and pivoted at one end to the platform 3 as shown at 13′ while at the opposite end each plate has a pin and slot connection 13″ with the platform 3. As the bundles are received from the binder they pass directly to the platform 3 at which time the plates 13 are in the positions shown in Fig. 2. A suitable number of bundles to form the shock being supported on the platform 3, the shaft 7 is rotated and the platform 3 rotated a half revolution thereby under manual control. The platform 3 is then elevated as before described and as it reaches the position shown in Figs. 1 and 3 an arm 14 connected at one end with a plunger 15 passing through the spindle 3ª strikes the topmost portion of a vertical end piece 2′ of the carriage 2. Said arm 14 has a bearing between its ends on the outer part of the support 4, which acts as a sort of fulcrum to cause the plunger 15 to be moved lengthwise in the operation of discharging bundles from the platform 3 to the shock former, when the upper end of the arm strikes the upper portion of the frame or carriage 2 as before mentioned. The plunger 15 has a plunger plate 16 on its upper end and above the platform 3 and when said plunger 15 is actuated by contact of the arm 14 with the frame part 2' the plate 16 against which the bundles of grain rest is pushed outwardly from the platform 3 thereby forcing the bundles from said platform onto the shock former supported by the carriage 2 and which will now be described.

The shock former comprises two angular forming members 17 and 18, each of said members comprising an upper wing and a lower wing, the wings of the respective members being denoted 17' and 18', and 17" and 18". The wings of each shock forming member are adapted for slight movement independently of one another and are pivoted by suitable hinge devices to the longitudinal frame bars of the carriage 2. The shock forming members are shown in their normal positions in Fig. 3 of the drawings in which it will be observed that the wings 17" and 18" are in approximately horizontal positions to support the shock as it is formed, while the wings 17' and 18' are in approximately vertical positions, the latter having been released, however, as hereinafter described so as to move slightly in a downward direction to force the shock forming plates inwardly against the bundles of grain to give the general form to the shock by compression of said bundles. The wings 17' and 18' while resting against the outer flanges of the plates 13 do not interfere with the return of the platform 3 to its original position and after the bundles thereon have been dumped onto the shock forming members. A spring or equivalent device 19 on the upper portion of the frame of the carriage acts as a buffer and tends to return the platform 3 outwardly after it has been elevated to unload the bundles into the shock former. When the platform 3 has assumed its former position the shaft 7 is rotated to turn the platform so that the plates 13 are arranged again in proper positions to receive thereon the bundles, and as shown in Fig. 2. When the wings 17' and 18' have been initially released so as to assume the position shown in Fig. 3 and the general conformation given to the shock, the shock forming members 17" and 18" are simultaneously released or permitted to drop, this operation being accomplished in the following manner. These members 17' and 18' are held in their uppermost positions by means of catches 34. Cables 20 (see Fig. 2) pass forwardly from points of connection with the frame 2 around drums 21 on a shaft 22. This shaft 22 is normally held from rotation by means of engagement of a clutch member 23 thereon with a fixed bracket 24 on one of the sills 1. As the pivoted support 4 is raised into the position shown by dotted lines in Fig. 1, however, it strikes an arm 25 mounted on a shifting rod 26 and thus imparts longitudinal movement to said rod disengaging the parts 23 and 24 and permitting the shock forming members 17 and 18 to drop into the position shown in Fig. 4 depositing the shock of grain upon the ground. The clutch member 23 is keyed upon the shaft 22, or otherwise secured thereto, whereby when the member 23 engages the bracket 24 the shaft 22 is prevented from rotation, as well as the drums 21 secured thereto and on which the ropes 20 are adapted to wind.

The operation of releasing the shock forming members 17 and 18 is peculiar. When the platform 3 is thrown upwardly into the position shown in dotted lines in Fig. 1, the pivoted support 4 strikes against the nose of a spring 27 on a release rod 28 supported by the sides 2' of the wheeled frame 2. The release rod 28 is connected at its rear end with a bail 29, the sides 29' of which are pivoted at their upper ends as shown at 30 to the upper portion of the frame 2. On the sides 29' of the bail 29 are catches 31 adapted to engage loops 32 which slide on the vertical standards or side pieces 2' of the frame 2, the loops 32 being formed at the upper ends of rods 33, the lower ends of which are connected pivotally with the outer portions of the wings 17" and 18" of the shock forming members 17 and 18, respectively. Fixed catches 34 on the outer sides of the wings 17' and 18' are adapted to engage with the sides of the bail 29, whereby to hold the wings 17' and 18' in their uppermost positions shown in Fig. 1. The movement of the release rod 28 by the member 4 as the latter is raised forces the bail catch 29 rearwardly and disengages the catches 34 therefrom just as the forming plates 13 enter the space between the wings in the operation of transferring the bundles of grain from the platform 3 to the shock former. Disengagement of the catches 34 permits slight inward movement of the wings 17' and 18' until they assume the positions shown in Fig. 3, moving the plates 13 into the positions also shown in this figure. The platform 3 having performed its proper function is permitted to resume its horizontal position being forced outwardly by the spring 19. The plates may be moved manually into their original positions. The support 4 as it moves downwardly exerts a pull on the release rod 28, said support 4 having been previously forced past the nose of the catch 27 so as to assume a position on the inside of the catch. When the release rod 28 is pulled forwardly as the platform 3 descends the catches 31 of the bail-catch 29 are disengaged from the loops 32, thus releasing the rods 33 by which the shock forming members 17″ and 18″ have been held in the elevated positions shown in Fig. 3. Of course, when the members 17 and 18 are released they drop simultaneously into the positions shown in Fig. 4 depositing the shock on the ground as before mentioned. It is to be understood that the shock forming members are permitted to move downwardly by release of the catches 31, and by reason of the fact that the connections or ropes 20 are free to unwind from the drums 21, rearward movement of the wheeled frame 2 is permitted.

The wheeled frame 2 is so mounted that it can slide longitudinally with reference to the spaced sills 1 forming the main frame of the machine. When the wings 17 and 18 turn downwardly to deposit the shock the wheeled frame 2 by reason of its weight and the friction between it and the shock, stops in its forward movement, the connections 20 unwinding from the drums 21, as the main frame 1, the shaft 22, and the drums 21 are carried forwardly by the draft connections with the binder. The above operation is accomplished in the following manner, it being borne in mind that the bracket 25 is rotatably mounted on the rod 26. As the platform 3 is raised the support 4 strikes the inclined portion 25′ of the bracket 25 thereby moving said bracket upwardly a sufficient distance to shift the shoulder 25″ of the bracket out of engagement with respect to the frame 2. By the time the side of the support 4 has reached the projection 25ª of the bracket 25 the continued movement of said support will force the bracket rearwardly thereby separating the clutch parts 23 and 24 and permitting the shock to stand still during the shock forming operation while the main frame 1 moves forwardly. When the support 3 resumes its normal position the bracket 25 will also move to its normal position by gravity ready for operation by the frame or carriage 2 when the latter has been pulled forward to its original position. The stopping of the wheeled frame permits the wings of the shock forming members to properly deposit, compress, and shape the bundles of grain into the shock in a manner which will be readily understood. The relative movement of the wheeled frame 2 with respect to the main frame comprising the sills 1 is illustrated clearly by dotted lines in Fig. 1. When the frame 2 has stopped momentarily, or the comparatively short period of time required to form the shock, the main frame has been advanced a sufficient distance to cause the rear portion of the frame 2 to strike the plate 35 which pivotally connects the rear end of the rod 26 with an adjacent sill 1, whereby slight longitudinal movement rearwardly is imparted to the rod 26 and a clutch member 39 movable with the clutch member 23 is thus thrown into engagement with the clutch element 37 of a beveled gear 38 loosely mounted on the shaft 22. The beveled gear 38 is constantly driven or rotated by a gear 36 on a driven shaft 40 so that when the clutch elements 39 and 37 are engaged automatically by the wheeled frame 2, the shaft 22 is caused to rotate with its drums 21, and the ropes 20 are wound up on the drums to thereby pull the wheeled frame 2 forwardly again until it assumes its original position shown in Figs. 1 and 2. As the frame 2 reaches its normal position in its forward movement on the sills 1, the front end of the frame strikes the bracket 25 on the rod 26 and thereby moves the rod 26 forwardly, said rod shifting the clutch members 39 and 23, through the bell crank lever connection 41, and causing the clutch member 23 to engage the bracket 24 locking the shaft 22 from movement by the drive gear 38 now disengaged from the clutch element 36.

The operation of restoring the shock forming members 17 and 18 to their uppermost positions is accomplished in the following manner. While the shaft 22 is driven from the shaft 40 in the manner above described a longitudinal shaft 42 mounted in suitable bearings on one of the sills 1 is also being driven, these two shafts having meshing beveled gears 43 thereon. An approximately vertical shaft 44 shown clearly in Fig. 5 is driven from the shaft 42 by providing suitable meshing gears 44′ and the shaft 44 is adapted to transmit motion to a horizontal transverse shaft 45 mounted in bearings on top of the wheeled frame 2. The shaft 44 has a beveled gear 46 at its upper end meshing with a similar gear 47 on the shaft 45. When the wheeled frame 2, after the shock depositing operation, has been advanced sufficiently far to be entirely disengaged from the shock the operator by pulling upon a pull-cord 48 will tilt a shifting lever 49 connected with the toothed clutch element 50 seen in Fig. 2, thereby shifting said clutch element into engagement with the gear 47 loose on the shaft 45 but being driven by the shaft 44.

It will be apparent that since the clutch element 50 is secured to the shaft 45 for rotation therewith, when the parts 47 and 50 are engaged the shaft 45 will be caused to rotate and its crank arms 45′ will move downwardly imparting similar movement to rods 51. The rods 51 connect the crank arms 45′ with arms 52 projecting outwardly from the wings 17″ and 18″ of the shock forming members. The downward movement of the crank arms 45′ raises the wings 17″ and 18″ to their original positions, and when shoulders 17ª and 18ª on the respective wings 17'' and 18'' abut with the under sides of the wings 17' and 18', the two wings forming each shock forming member move upwardly together in the operation of assuming their normal positions. When the loops 32 of the rods 33 have been moved upwardly a certain distance they are engaged by the catches 31 of the member 29, thereby locking the shock forming members in their normal positions, and the catches 34 being also engaged with the sides 29' of the member 29 in this operation. Springs 29'' engage and hold the sides 29' in their normal positions. A rod 53 connected with one of the arms 52 by the pivot 54 has its upper end connected with a lever 55 connected with the clutch member 50 so that as the arm 52 moves downwardly in raising the members 17 and 18, when the said members are at their limit of their upward movement, the rod 53 tilts the lever 55 and disengages the clutch part 50 from the gear 47 automatically discontinuing the rotation of the crank shaft 45. The parts 53 and 55 are connected by the pin, slot, and spring connection shown at *a* in Fig. 6 of the drawings.

It will be noticed that when the arm 45' has completed its downward movement in raising the members 17 and 18, it passes its lowermost position and in its continued but now upward movement elevates the arm 52 slightly and just enough to disengage the clutch 50 from the gear 47 and through the connections described. The pin and slot connection of the members 53 and 55 is necessary to allow the clutch to be shifted by the rod 48, independently of the rod 53. When the shock forming members 17 and 18 are in their normal position the pin in the member 55 will remain in the upper end of the slot in the rod 53 being so held by the spring, and the clutch member 50 is then out of engagement with the gear 47. As the arm 53 moves upward the pin in the arm 55 is forced past the bend of the spring and will be located below said bend so that as the clutch member 50 is shifted by the rod 48, to lift the members 17 and 18 to their normal position, the rod 53 in its downward movement will cause the pin on arm 53 to pass the bend of the spring. On the upward movement of the rod 53 the clutch 50 will be shifted out of engagement through the arm 55 under the action of the spring.

It will be observed that a machine constructed in accordance with this invention possesses many advantages and is especially useful in territory where grain is raised on a large scale. Furthermore, it is to be understood that we are not limited to the exact construction of parts, or the arrangement specifically described herein with respect thereto, but may make changes in form limited only by the scope of the appended claims.

Having thus described the invention, what is claimed as new, is:—

1. In a machine of the class described, the combination of a bundle receiving platform, a shock former, means for elevating the platform to transfer the grain bundles therefrom to the former, and means for rotating the platform preliminary to the upward movement thereof.

2. In a machine of the class described, the combination of a bundle receiving platform, means for rotating the same, a shock former, and means for raising the platform to a point above the former and positively shifting the bundles of grain from the platform to the former.

3. In a machine of the class described, the combination of a bundle receiving platform, means for rotating the platform, a shock former, means for elevating the platform, and means for positively shifting the grain bundles from the platform to the former after elevation of the platform.

4. In a machine of the class described, the combination of a pivoted bundle receiving platform, a former, means for elevating said platform by pivotal movement, and an automatically operable plunger plate for positively shifting the grain bundles from the platform to the former, after the platform is elevated.

5. In a machine of the class described, the combination of a main frame, a wheeled frame movable longitudinally thereof, a shock former carried by the wheeled frame, means for depositing bundles of grain in the former, means for moving the former to deposit the shock of grain upon the ground, means for moving the main and wheeled frames simultaneously and means for causing the wheeled frame to remain stationary with respect to the ground during the shock depositing operation.

6. In a machine of the class described, the combination of a main frame, a wheeled frame movable longitudinally thereof, a shock former mounted on the wheeled frame, means for moving the former to deposit the shock of grain, connecting means between the main frame and the wheeled frame for moving them simultaneously, means for controlling said connecting means to cause the wheeled frame to remain stationary with respect to the ground during the shock depositing operation, and means for restoring the wheeled frame to its original position.

7. In a machine of the class described, the combination of a main frame, a shock former comprising members slidable on said main frame and comprising pivotally movable members, means for depositing bundles of grain on the former, means for effecting pivotal movement of the members of the former to deposit the grain on the ground, means for holding the former in a predetermined position on the main frame so as to move therewith, and means for rendering the former stationary with respect to the ground during the operation of depositing the bundles on the ground.

In testimony whereof we affix our signatures in presence of two witnesses.

JOHN YANZICK, Jr.
FRANCIS McDERMOTT.

Witnesses:
　NAOMI TOOMEY,
　JOHN WALZMUCK.